US012704733B2

(12) United States Patent
Ding et al.

(10) Patent No.: US 12,704,733 B2
(45) Date of Patent: Aug. 11, 2026

(54) ELECTRONIC DEVICES WITH COMPOUND PLANETARY GEARBOXES

(71) Applicant: Apple Inc., Cupertino, CA (US)

(72) Inventors: Huali Ding, Campbell, CA (US); Alexander B von Schulmann, Sunnyvale, CA (US); Matin Seadat Beheshti, Sunnyvale, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 18/883,792

(22) Filed: Sep. 12, 2024

(65) Prior Publication Data

US 2025/0172813 A1 May 29, 2025

Related U.S. Application Data

(60) Provisional application No. 63/604,028, filed on Nov. 29, 2023.

(51) Int. Cl.
*G02B 27/01* (2006.01)
*F16H 57/08* (2006.01)

(52) U.S. Cl.
CPC ....... *G02B 27/0176* (2013.01); *F16H 57/082* (2013.01); *G02B 2027/0134* (2013.01); *G02B 2027/0178* (2013.01); *G02B 2027/0198* (2013.01)

(58) Field of Classification Search
CPC ........ G02B 27/0176; G02B 2027/0134; G02B 2027/0178; G02B 2027/0198; F16H 57/082
See application file for complete search history.

(56) References Cited

U.S. PATENT DOCUMENTS 8,096,917 B2 1/2012 Benito
8,460,150 B2 6/2013 Kraynev et al.
10,399,437 B2 9/2019 Ruscak et al.
10,926,398 B2 2/2021 Tomayko
11,746,876 B2 9/2023 Lundbäck
12,275,514 B1 * 4/2025 Maxeiner ............... B63H 3/081
(Continued)

FOREIGN PATENT DOCUMENTS

CN 205003362 U * 1/2016 ............. G02B 27/01

*Primary Examiner* — Kwang-Su Yang
(74) *Attorney, Agent, or Firm* — Treyz Law Group, P.C.; David K. Cole

(57) ABSTRACT

Electronic devices such as head-mounted electronic devices may include displays for presenting images to users. To accommodate variations in the interpupillary distances associated with different users, a head-mounted device may have left-eye and right-eye optical modules that move with respect to each other with actuators. The actuators may include motors, compound planetary gearboxes, and lead screws that move the optical modules. In particular, the compound planetary gearboxes may have high reduction ratios to reduce the size of the actuators while providing sufficient torque to move the optical modules. The compound planetary gearboxes may include first and second planet gears coupled to common shafts, and carriers that carry the planet gears and that drive the lead screws. The second planet gears may have smaller diameters than the first planet gears, and the second planet gears may mesh with teeth on a ring gear, to provide the high reduction ratio.

20 Claims, 5 Drawing Sheets

(56) References Cited

U.S. PATENT DOCUMENTS

| | | | | |
|---|---|---|---|---|
| 2010/0267508 | A1 | 10/2010 | Hvolka et al. | |
| 2015/0102655 | A1* | 4/2015 | Tesar | F16D 21/04 301/6.5 |
| 2019/0249351 | A1* | 8/2019 | Jackson | D06F 37/40 |
| 2019/0249760 | A1* | 8/2019 | Pritchard | F16H 48/11 |
| 2019/0286017 | A1* | 9/2019 | Nakamoto | G03G 15/1615 |
| 2020/0291930 | A1* | 9/2020 | Marshall | F04B 43/04 |
| 2024/0151980 | A1* | 5/2024 | Liu | G02B 27/01 |
| 2024/0411143 | A1* | 12/2024 | Yan | G02B 27/0176 |

* cited by examiner

ELECTRONIC DEVICES WITH COMPOUND PLANETARY GEARBOXES

This application claims the benefit of U.S. provisional patent application No. 63/604,028, filed Nov. 29, 2023, which is hereby incorporated by reference herein in its entirety.

FIELD

This relates generally to electronic devices, and, more particularly, to wearable electronic devices such as head-mounted devices.

BACKGROUND

Electronic devices such as head-mounted devices are configured to be worn on a head of a user. A head-mounted device may have left and right optical systems for presenting images to a user's left and right eyes. It may be desirable to adjust the positions of the left and right optical systems.

SUMMARY

Electronic devices such as head-mounted electronic devices may include displays for presenting images to users. To accommodate variations in the interpupillary distances associated with different users, a head-mounted device may have left-eye and right-eye optical modules that move with respect to each other. Each optical module may include a display device for producing an image and an associated optical component such as a lens for providing the image to an associated eye box in which an eye of the user is located for viewing the image. The optical modules, which may sometimes be referred to as optical systems, display systems, lens systems, lens and display assemblies, etc., may each have a support structure such as a lens barrel that supports a respective display and lens.

Actuators may be used to position the lens barrels within the housing of a head-mounted device. The actuators may include motors, compound planetary gearboxes, and lead screws that move the optical modules. In particular, the compound planetary gearboxes may have high reduction ratios to reduce the size of the actuators while providing sufficient torque to move the optical modules.

The compound planetary gearboxes may include first and second planet gears coupled to common shafts, and carriers that carry the planet gears and that drive the lead screws. The second planet gears may have smaller diameters than the first planet gears, and the second planet gears may mesh with teeth on a ring gear, to provide the high reduction ratio.

DETAILED DESCRIPTION

An electronic device such as a head-mounted device may have a front face that faces away from a user's head and may have an opposing rear face that faces the user's head. Optical modules on the rear face may be used to provide images to a user's eyes. The positions of the optical modules may be adjusted to accommodate different user interpupillary distances and/or to provide other suitable adjustments. Internal device structures may be hidden from view by the user by covering the rear face of the device with a curtain. The curtain, which may sometimes be referred to as a cover, covering structure, rear housing cover, rear housing wall, rear housing structure, cosmetic covering, etc., may help block potentially unsightly internal structures from view, while accommodating movement of the optical modules.

To move the optical modules, one or more actuators may be used. In particular, to allow for active adjustment of the optical modules, the actuators may include motors. The motors may turn a lead screw, which in turn moves an optical module. In this way, the optical modules may be adjusted automatically.

The actuators may have a small footprint to fit into the head-mounted device and may provide enough torque to move the optical modules and other connected components, such as the curtain. Therefore, the actuators may include a small motor with low torque coupled to a gearbox with a high reduction ratio. In particular, the gearbox may be a planetary gearbox with a compound stage design to provide a high reduction ratio and a small footprint.

Figure 1:
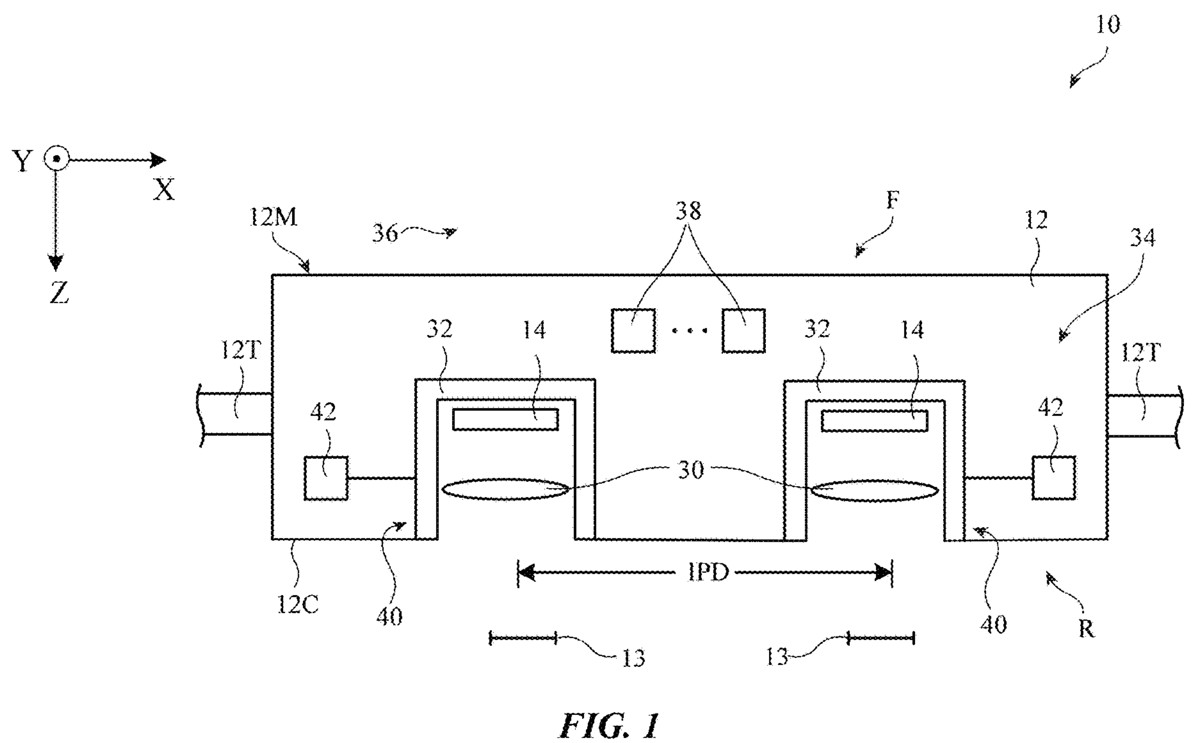
FIG. 1 is a top view of an illustrative head-mounted device in accordance with some embodiments.

A top view of an illustrative head-mounted device that may include an actuator with a planetary gearbox is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures that help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as curtain 12C. In an illustrative configuration, curtain 12C includes a fabric layer that separates interior region 34 from the exterior region to the rear of device 10. Other structures may be used in forming curtain 12C, if desired. The presence of curtain 12C on rear face R may help hide internal housing structures, internal components 38, and other structures in interior region 34 from view by a user.

Device 10 may have left and right optical modules 40 (also referred to as optical assemblies 40 herein). Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30. Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images. Lenses 30 may include one or more lens elements for providing image light from displays 14 to respective eyes boxes 13. Lenses may be implemented using refractive glass lens elements, using mirror lens structures (catadioptric lenses), using holographic lenses, and/or other lens systems. When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 42. Actuators 42 can be manually controlled and/or computer-controlled actuators (e.g., computer-controlled motors) for moving support structures 32 relative to each other.

Figure 2:
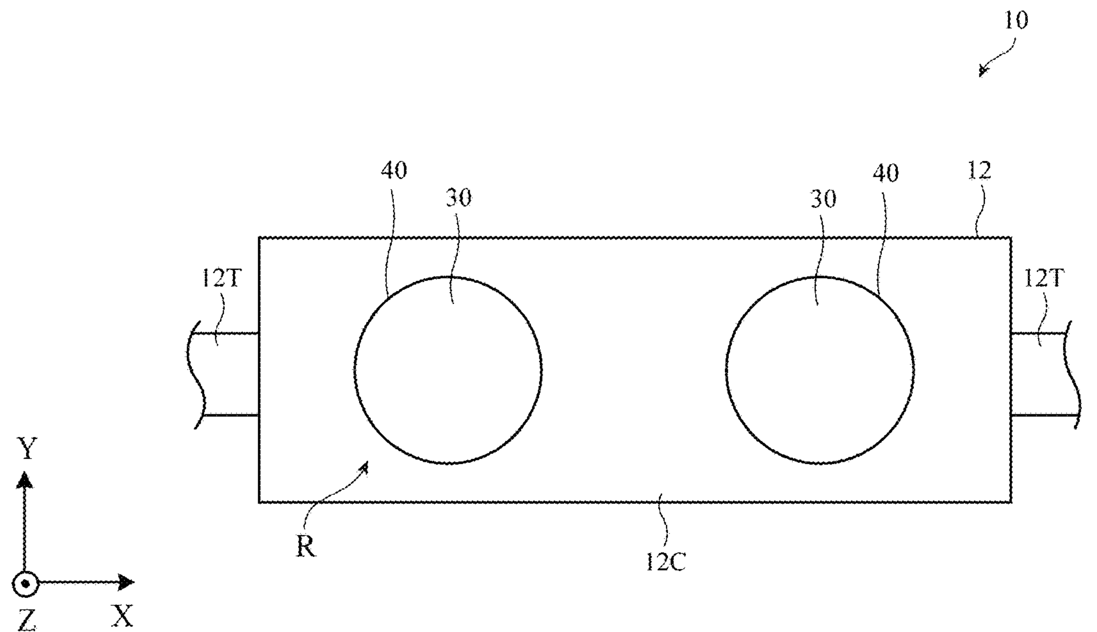
FIG. 2 is a rear view of an illustrative head-mounted device in accordance with some embodiments.

As shown in FIG. 2, curtain 12C may cover rear face R while leaving lenses 30 of optical modules 40 uncovered (e.g., curtain 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other. To prevent undesired wrinkling and buckling of curtain 12C as optical modules 40 are moved relative to rigid portions of housing 12M and relative to each other, a fabric layer or other cover layer in curtain 12C may be configured to slide, stretch, open/close, and/or otherwise adjust to accommodate optical module movement.

Figure 3:
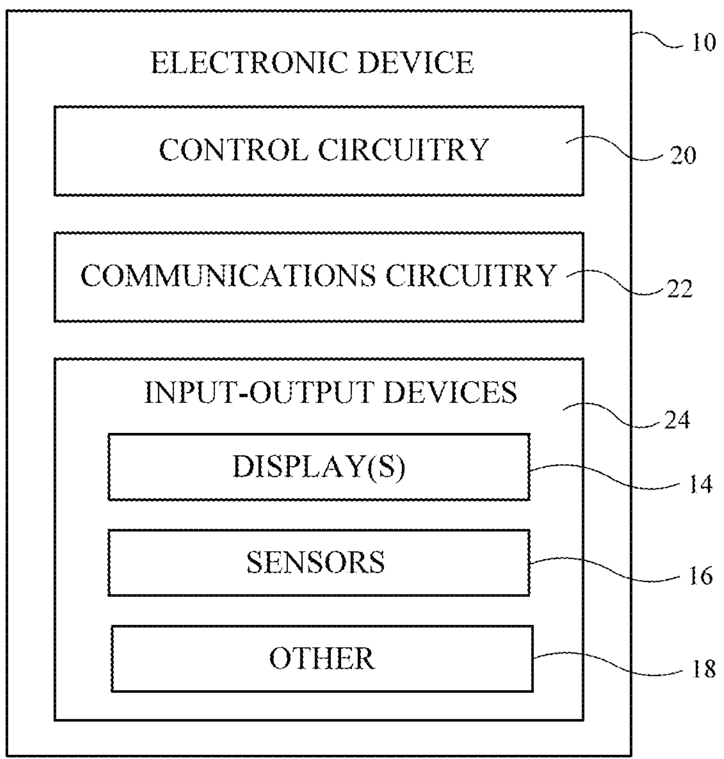
FIG. 3 is a schematic diagram of an illustrative head-mounted device in accordance with some embodiments.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid-state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Regardless of components within electronic device 10, it may be desirable to move optical modules 40 using actuators 42 (FIG. 1). In particular, it may be desirable to move these optical modules automatically. Therefore, a motor may be incorporated into actuator 42. An illustrative example of an actuator that may be used to move an optical module is shown in FIG. 4.

Figure 4:
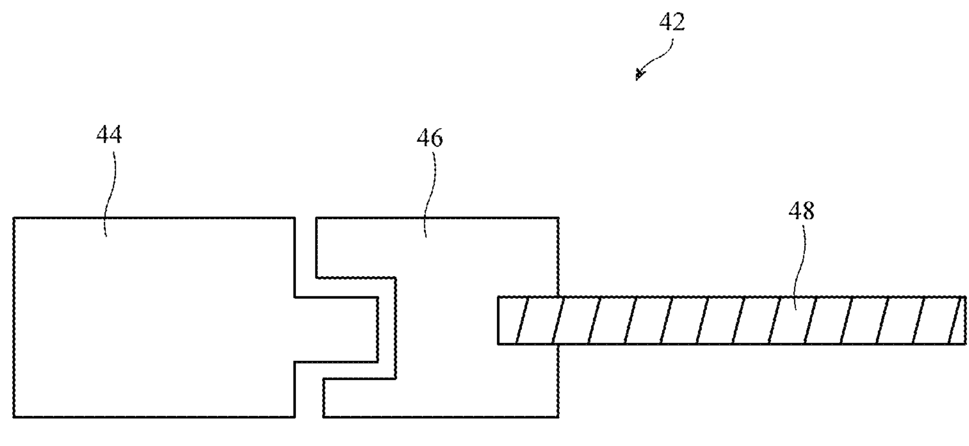
FIG. 4 is a schematic diagram of an illustrative actuator that may be used in a head-mounted device in accordance with some embodiments.

As shown in FIG. 4, actuator 42 may include motor 44, gearbox 46, and lead screw 48. Motor 44 may be, for example, a small motor with low torque, such as a stepper motor. For example, motor 44 may have a diameter of less than 10 mm, of 8 mm, of less than 15 mm, of between 5 mm and 12 mm, or another suitable diameter.

Gearbox 46 may couple motor 44 to lead screw 48. In operation, motor 44 may drive gearbox 46, which in turn may drive lead screw 48. Lead screw 48 may be coupled to an optical module 40 (FIG. 1) or another adjustable component in device 10. In this way, actuator 42 may automatically adjust an optical module or other adjustable component in device 10.

Because motor 44 is small and has low torque, gearbox 46 may have a high reduction ratio to increase the torque of actuator 42. For example, gearbox 46 may have a reduction ratio of at least 7:1, of at least 5:1, of between 7:1 and 15:1, of 7.3:1, or of another suitable reduction ratio. Therefore, the torque applied to lead screw 48 may be increased, allowing lead screw 48 to move larger loads.

To have a high reduction ratio in a small size, gearbox 46 may be a compound planetary gearbox. An illustrative example of a compound planetary gearbox is shown in FIG. 5.

Figure 5:
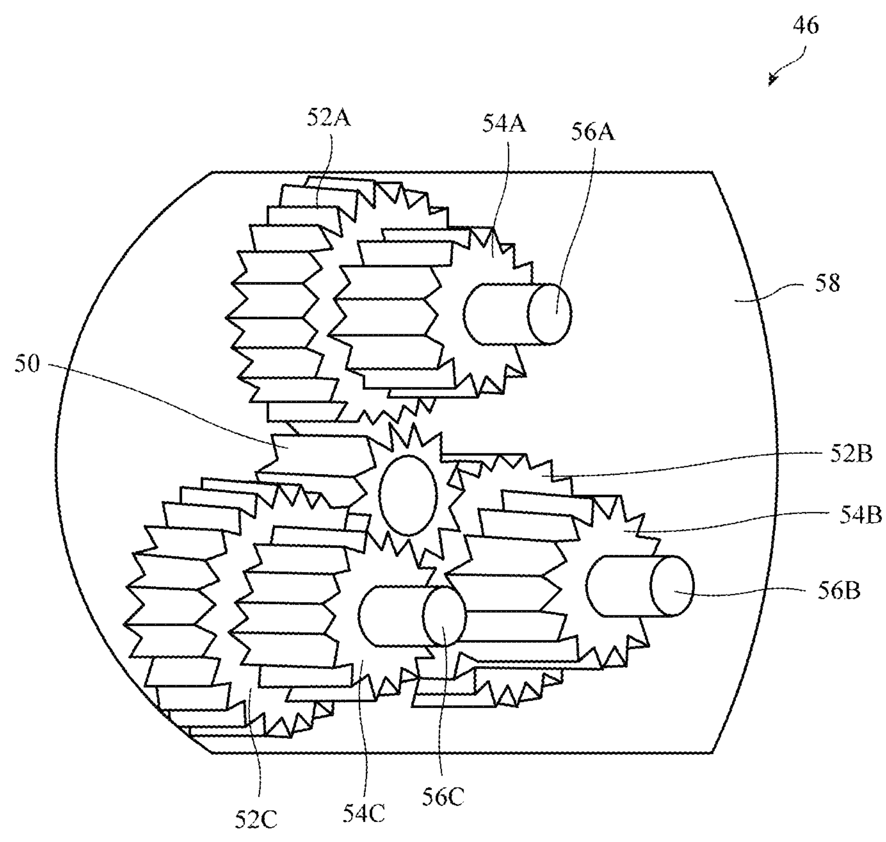
FIG. 5 is a perspective view of an illustrative compound planetary gearbox that may be used in an actuator in accordance with some embodiments.

As shown in FIG. 5, gearbox 46 may include first planet gears 52A, 52B, and 52C that are driven by gear 50 (also referred to as input gear 50 herein). Gear 50 may be coupled to the output of motor 44 (FIG. 4). Carrier 58 may carry first planet gears 52, second planet gears 54, and shafts 56.

Shafts 56A, 56B, and 56C may extend into each of first planet gears 52A, 52B, and 52C, respectively. Second planet gears 54A, 54B, and 54C may be coupled to shafts 56A, 56B, and 56C, respectively. Second planet gears 54 may be smaller, such as having smaller diameters, than first planet gears 52. Shafts 56 may be press-fit pins, snap-fit pins, or other suitable pins to couple second planet gears 54 to first planet gears 52. Alternatively or additionally, shafts 56 may be formed integrally with carrier 58. In this way, each of first planet gears 52 and second planet gears 54 may be formed in-line on a common shaft 56.

By having first planet gears 52 and second planet gears 54, gearbox 46 may be a compound planetary gear box and have a high reduction ratio, such as of at least 7:1, of at least 5:1, of greater than 10:1, of between 7:1 and 15:1, or of 7.3:1, as examples, while maintaining a small footprint. In particular, because first planet gears 52 and second planet gears 54 are formed on a common shaft 56, first and second planet gears 52 and 54 may rotate and orbit at the same speed, but mesh with different gears, thereby allowing a higher reduction per stage and a higher torque-to-weight ratio.

Although FIG. 5 shows gearbox 46 with three first planet gears 52, three second planet gears 54, and three shafts 56, this is merely illustrative. In general, gearbox 46 may include any suitable number of first planet gears, second planet gears, and shafts between the first and second planet gears.

Gearbox 46 may be within the actuator to drive lead screw 48. An illustrative example of gearbox 46 in an actuator is shown in FIG. 6

Figure 6:
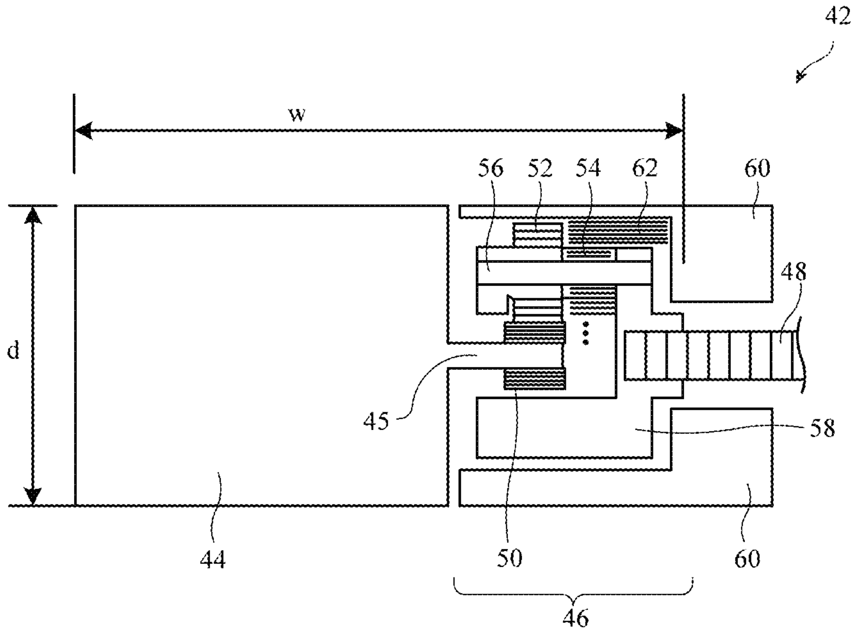
FIG. 6 is a top view of an illustrative actuator including a compound planetary gearbox in accordance with some embodiments.

As shown in FIG. 6, actuator 42 may include gearbox 46 coupled to motor 44. In particular, shaft 45 may be coupled to gear 50, which in turn may be coupled to first planetary gear 52. First planetary gear 52 may be formed on shaft 56 with second planetary gear 54. Shaft 56 may be coupled to carrier 58, which in turn is coupled to lead screw 48. Additionally, the teeth of second planetary gear 54 may mesh with teeth on ring gear 60.

In operation, motor 44 may spin shaft 45, which may rotate gear 50. Because the teeth of gear 50 are meshed with the teeth of planet gear 52, planet gear 52 may rotate with gear 50. The rotation of gear 50 may rotate shaft 56 and planet gear 54. As shaft 56 rotates, carrier 58 will also rotate, therefore rotating lead screw 48. As previously discussed, lead screw 48 may then move a component in the electronic device, such as an optical module.

Moreover, because the teeth of second planet gear 54 are meshed with teeth 62 of ring gear 60, and second planet gear 54 is smaller than first planet gear 52, carrier 58 and therefore lead screw 48 may rotate with more torque than if second planet gear 54 were omitted. In this way, gearbox 46 may have a high reduction ratio, such as of at least 7:1, of at least 5:1, of between 7:1 and 15:1, or of 7.3:1, as examples, to increase the output torque of lead screw 48.

Additionally, actuator 42, including gearbox 46, may have a small footprint. In particular, gearbox 46 and motor 44 may have diameter d and width w. Diameter d may be less than 10 mm, between 5 mm and 12 mm, 8 mm, at least 5 mm, or another suitable diameter. Width w may be less than 20 mm, between 14 mm and 19 mm, 16 mm, at least 12 mm, or other suitable width. Therefore, gearbox 46 may provide lead screw 48 with increased torque relative to the output of motor 44, while maintaining a small form factor for actuator 42, allowing actuator 42 to be mounted in an electronic device, such as a head-mounted device.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
- a head-mounted support structure;
- an optical module in the head-mounted support structure; and
- an actuator in the head-mounted support structure configured to move the optical module, wherein the actuator comprises:
  - a motor;
  - a compound planetary gearbox coupled to the motor; and
  - a lead screw coupled to the compound planetary gearbox.

2. The head-mounted device of claim 1, wherein the compound planetary gearbox comprises first planet gears and second planet gears coupled to common shafts.

3. The head-mounted device of claim 2, wherein the common shafts are coupled to a carrier, and the carrier is coupled to the lead screw.

4. The head-mounted device of claim 3, wherein the motor comprises an output shaft coupled to a gear, and the gear is coupled to the first planet gears.

5. The head-mounted device of claim 4, wherein the carrier is configured to rotate in response to input from the motor, and the carrier is configured to rotate the lead screw to move the optical module.

6. The head-mounted device of claim 5, wherein the actuator further comprises:
- a ring gear that surrounds the carrier, wherein the ring gear comprises teeth that mesh with teeth of the second planet gears.

7. The head-mounted device of claim 2, wherein the first planet gears have a first diameter and the second planet gears have a second diameter that is less than the first diameter.

8. The head-mounted device of claim 7, wherein the common shafts are press-fit pins coupled to the first and second planet gears.

9. The head-mounted device of claim 7, wherein the common shafts are snap-fit pins coupled to the first and second planet gears.

10. The head-mounted device of claim 2, wherein the gearbox has a reduction ratio of at least 7:1.

11. The head-mounted device of claim 10, wherein the motor and the gearbox have a diameter of less than 10 mm and a width of less than 20 mm.

12. A head-mounted device, comprising:
- a head-mounted support structure;
- an optical module in the head-mounted support structure; and
- an actuator in the head-mounted support structure configured to move the optical module, wherein the actuator comprises:
  - a motor; and
  - a compound planetary gearbox coupled to the motor, comprising:
    - an input gear;
    - first planet gears having first diameters, wherein the first planet gears are coupled to the input gear;
    - second planet gears having second diameters that are less than the first diameters;
    - common shafts to which the first planet gears and the second planet gears are coupled; and
    - a carrier to which the common shafts are coupled, wherein the carrier is configured to rotate to provide output from the compound planetary gearbox.

13. The head-mounted device of claim 12, wherein the compound planetary gearbox further comprises:
- a ring gear that surrounds the first planet gears, the second planet gears, and the carrier, wherein the ring gear comprises teeth that mesh with teeth of the second planet gears.

14. The head-mounted device of claim 13, wherein the common shafts are press-fit pins.

15. The head-mounted device of claim 13, wherein the common shafts are snap-fit pins.

16. The head-mounted device of claim 13, wherein the common shafts are integrally formed with the carrier.

17. The head-mounted device of claim 13, wherein the first planet gears comprise three first planet gears, the second planet gears comprise three second planet gears, and the common shafts comprise three shafts.

18. An electronic device, comprising:
- a housing; and
- an actuator in the housing, wherein the actuator comprises:
  - a motor;
  - a compound planetary gearbox coupled to the motor, wherein the compound planetary gearbox has a reduction ratio of at least 7:1, and the motor and the compound planetary gearbox have a diameter of less than 10 mm and a width of less than 20 mm; and
  - a lead screw coupled to the compound planetary gearbox.

19. The electronic device of claim 18, wherein the reduction ratio of the compound planetary gearbox is greater than 10:1.

20. The electronic device of claim 18, wherein the compound planetary gearbox comprises first planetary gears and second planetary gears coupled to common shafts, and a carrier that carries the first and second planetary gears and that is coupled to the common shafts to rotate as the first and second planetary gears rotate.

* * * * *